United States Patent [19]
Danforth et al.

[11] Patent Number: 5,761,509
[45] Date of Patent: Jun. 2, 1998

[54] SYSTEM AND METHOD FOR ENABLING BEFORE/AFTER METHOD PROCESSING IN AN OBJECT ORIENTED SYSTEM

[75] Inventors: Scott Harrison Danforth; Ira Richard Forman; Hari Haranath Madduri, all of Austin, Tex.

[73] Assignee: International Business Machines Corporation, Armonk, N.Y.

[21] Appl. No.: 800,013

[22] Filed: Feb. 13, 1997

Related U.S. Application Data

[63] Continuation of Ser. No. 77,229, Jun. 14, 1993, abandoned.

[51] Int. Cl.$^6$ .................................................. G06F 9/40
[52] U.S. Cl. .................. 395/701; 395/673; 395/683; 395/572; 395/590
[58] Field of Search ................................ 395/701, 702, 395/673, 683, 572, 590, 680

[56] References Cited

U.S. PATENT DOCUMENTS

| 5,095,427 | 3/1992 | Tanaka et al. | 395/700 |
|---|---|---|---|
| 5,315,703 | 5/1994 | Matheny et al. | 395/164 |
| 5,339,438 | 8/1994 | Conner et al. | 395/700 |
| 5,361,350 | 11/1994 | Conner et al. | 395/600 |

OTHER PUBLICATIONS

"Artifical Intelligence and the Design of Expert Systems" by Luger et al, 1989.

Luger et al, "Artifical Intelligence and the Design of Expert Systems", 1989, pp. 546–548.

*OOPSLA '89 Conference Proceedings*, Oct. 1–6, 1989, "Metaclass Compatability", N. Graube, pp. 305–316.

*OOPSLA '89 Conference Proceedings*, Oct. 1–6, 1989, "Programming with Explicit Metaclasses in Smalltalk–80", P. Cointe et al, pp. 419–431.

*OOPSLA '87 Conference Proceedings*, Oct. 1–6, 1989, "Metaclasses are First Class: the ObjVlisp Model", P. Cointe et al, pp. 156–167.

*Object–Oriented Concepts, Databases, and Appications*, ACM Press, New York(1989), "Proteus: A Frame–Based Nonmontonic Inference System", D. M. Russinoff, pp. 127–150.

*IBM Personal Systems Developer*, Winter 1992, "Object–Oriented Programming in OS/2 2.0", R. Sessions et al, pp. 107–119.

*IBM OS/2 Developer*, Summer 1992, "Class Objects in SOM", N. Coskun et al, pp. 67–77.

1990 International Conference On Computer Languages Mar. 1990, New Orlean, USA pp. 190–197 XP289135 Harrison and Ossher 'Subdivided Procedures: A Language Extension Supporting Extensible Programming'.

IBM Technical Disclosure Bulletin, vol. 35, No. 5, Oct. 1992, New Yor US pp. 337–338 "Resolution Procedure for Object Oriented Programming Systems".

IBM Technical Disclosure Bulletin, vol. 36, No. 3, Mar. 1993, New York US pp. 329 –332 "Efficient Implementation of ACLS for Object–Oriented Systems".

*Primary Examiner*—Alvin E. Oberley
*Assistant Examiner*—Michael T. Richey
*Attorney, Agent, or Firm*—David A. Mims, Jr.; Mark S. Walker

[57] ABSTRACT

A system for creating before and after behavior upon invocation of a method in an object-oriented system. The framework provides metaclasses containing methods for dispatching a before method and an after method at the time of invocation of each client method in subclass instances. Object-oriented system properties of inheritance and encapsulation are supported as are derived metaclasses. Derivation ensures that the specification syntax for each class does not impact the expected result. The combination of explicit before after classes, dispatcher class, and derived metaclasses ensures that the system will have associative composition.

7 Claims, 4 Drawing Sheets

SYSTEM AND METHOD FOR ENABLING BEFORE/AFTER METHOD PROCESSING IN AN OBJECT ORIENTED SYSTEM

This is a continuation of application Ser. No. 08/077,229 filed on Jun. 14, 1993 now abandoned.

BACKGROUND OF THE INVENTION

1. Field of the Invention

The present invention relates to electronic data processing systems and more particularly to systems in which processing methods and data are gathered into objects. Still more particularly, the present invention relates to object-oriented systems in which special methods may be processed before and after defined processing methods.

2. Background and Related Art

The development of application and system software for data processing systems has traditionally been a time consuming task. The field of software engineering has attempted to overcome the limitations of traditional techniques by proposing new, more efficient software development models. Object-oriented programming has emerged as a promising technology that will allow rapid development, implementation, and customization of new software systems.

Progress in programming technology can be viewed as being shown by the increased level of abstraction employed. Programming technology has progressed through abstractions that grouped ever larger entities. Assembly language instructions were first gathered into control structures, and control structures latter gathered in to procedures. Procedures, in turn, were gathered into abstract data types. Object-oriented programming can be viewed as providing a higher level of abstraction of programming entities than these previous techniques. Object-oriented programming gathers abstract data types into an inheritance hierarchy. The present invention is directed to a further abstraction, a metaclass that provides before and after processing for methods of instances of its instances.

Object-oriented programming uses a toolkit of system objects that can be assembled to perform the required task. Each object has certain data attributes and processes or methods that operate on that data. Data is said to be "encapsulated" by an object and can only be modified by the object methods. Methods are invoked by sending a message to an object identifying the method and supplying any needed arguments.

Object-oriented systems have two important properties in addition to encapsulation. "Inheritance" is the ability to derive a new object from an existing object and inherit all properties, including methods and data structure, from the existing object The new object may have certain unique features that are supplied as overrides or modifications to the existing class. I.e., a new subclass needs to specify only the functions and data that distinguish that class from the existing more general class. "Polymorphism" is the second property. In object-oriented programming, polymorphism is the ability of an entity (e.g. a variable) to refer at run-time to instances of different classes. Practically, this means that a single message to an object can be processed in different ways depending on the object itself.

Inheritance and polymorphism create a powerful structure for implementing new software systems. The software developer does not have to develop each piece of a system, he or she need only specify the unique features of the system.

The power of object-oriented systems is realized through the development of system "frameworks." A framework is a collection of base classes that can be used by a system implementer to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system. Object frameworks, like electronic components, typically cannot be changed by the engineer. Instead the engineer must add other objects that interface with the framework in the manner defined by the framework.

Examples of object frameworks are contained in the SOMobjects product developed by the IBM Corp. SOMobjects defines a number of objects, object classes, and object metaclasses for use in software system development. The system developer uses components of the SOMobjects framework and extends those by creating new subclasses based on the framework classes. SOMobjects provides a compiler language neutral interface description language (IDL) for specifying new subclasses and methods. The IDL specification created by the software engineer contains information about the parent classes used by the engineer and specifies any methods that override methods in parent classes.

Computer software developers frequently need to know the state of a computer system before execution of a process and then again after execution of that process. This information can be used when debugging a new system to make sure the process is performing correctly. It can also be used to implement features such as security locks, record locks, and database logging. Existing object-oriented systems provide no easy way to specify methods to be executed before and after each instance method without explicitly specifying the behavior for each method.

The technical problem addressed by the present invention is how to provide an object based ability to specify methods to be performed before and after the methods of all instances of a particular class and ensure that these methods compose.

SUMMARY OF THE INVENTION

The present invention solves the before and after method execution problem by providing an object-oriented framework that has a BeforeAfterDispatch metacalss as the class for a BeforeAfter class. Classes having before/after behaviors can be created as subclasses of the BeforeAfter class. The BeforeAfterDispatch metaclass supports the dispatch methods necessary to implement before/after processing and is structured to ensure associative composition of subclass descriptions.

The present invention is directed to a system for enabling construction of object-oriented classes implementing before and after behavior for each dispatch of a method process, the system operating in a computer system having memory means and processing means, the system including at least one class means having data and methods for processing the data. The system has the following components: means for dispatching a BeforeMethod and an AfterMethod respectively before and after dispatching a method process, the means for dispatching being responsive to signaling of a class means; class means for signaling method processing dispatch, the means being responsive to before and after behavior requests, the class means being a subclass of one of the at least one class means and an instance of the means for dispatching; and subclass means for generating before and after behavior requests to the class means, the subclass means being a subclass of the BeforeAfter Class and being responsive to an instance method invocation.

Thus it is an object of the present invention to enable before/after processing for all methods of a particular class.

It is a further objective to implement a before/after processing structure that consistently composes at run time.

It is yet another object to provide a before/after structure that is associative, i.e. composition of three or more beforeAfter metaclasses produces the same result regardless of the order in which they are composed. E.g., the phrasing (A+B)+C=A+(B+C).

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The preferred embodiment of the present invention will be described with reference to the figures in which like reference number represent like parts.

Figure 1:
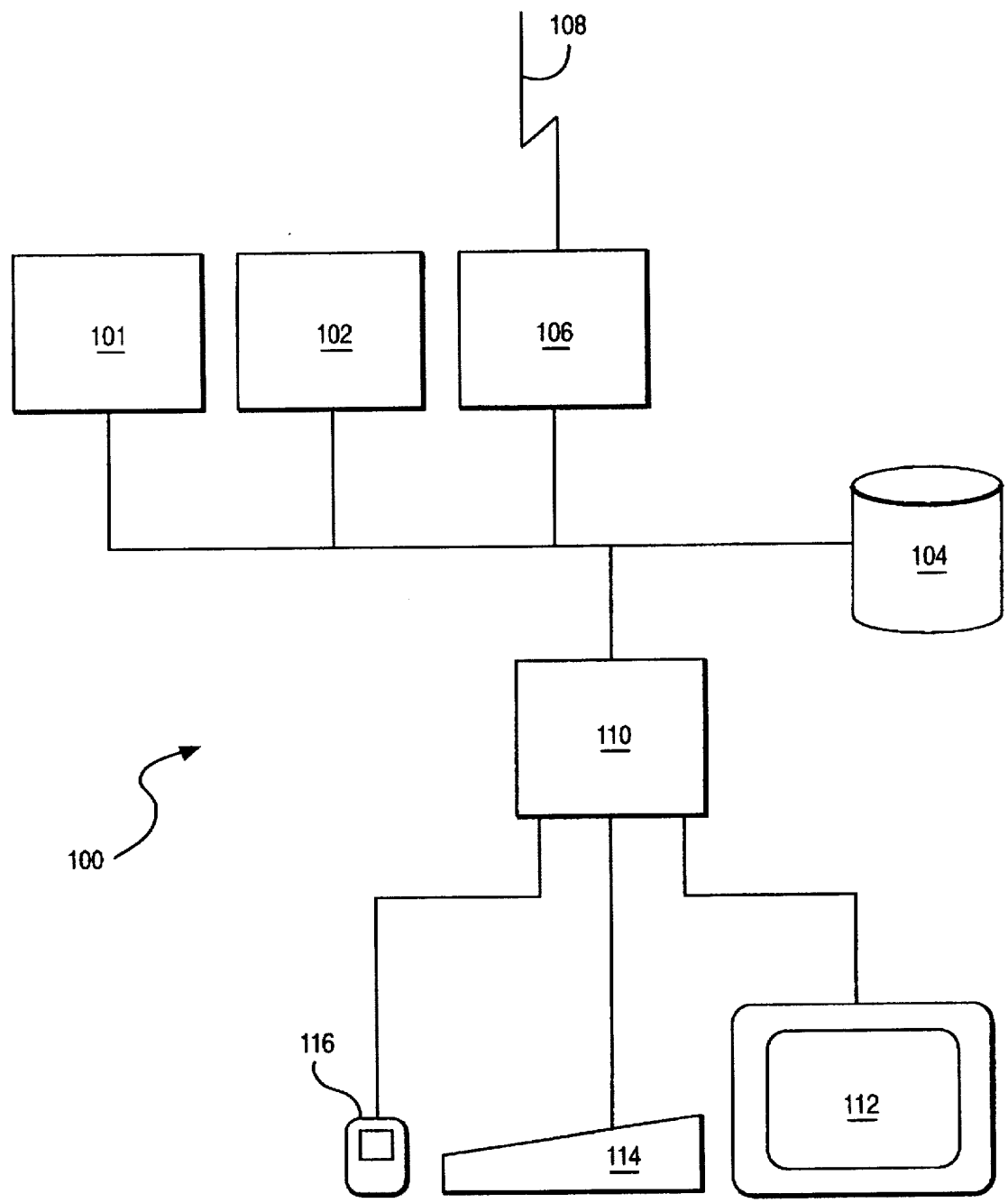
FIG. 1 is a block diagram of a computer system of the type to embody the present invention.

FIG. 1 illustrates a computer system capable of being structured according to the present invention. The computer system 100 has a processor 101, a random access memory 104, a permanent storage device 104, a communications adapter 106 connecting the system to a network 108, and an I/O controller 110 controlling operation of a display 112, a keyboard 114, and a pointing device 116. The computer system can be one of many known systems such as the IBM Personal System/2 (PS/2) computer system or the IBM RISC System/6000 computer system. (IBM, Personal System/2, PS/2, and RISC System/6000 are trademarks of the IBM Corp.) The components can be of any known type. Permanent storage 104 can be a fixed disk storage system, a removable diskette, or other fixed or removable media such as tape cartridge, CD-ROM, or WORM. The framework of the present invention may be embodied in a removable media for storage and distribution.

Figure 2:
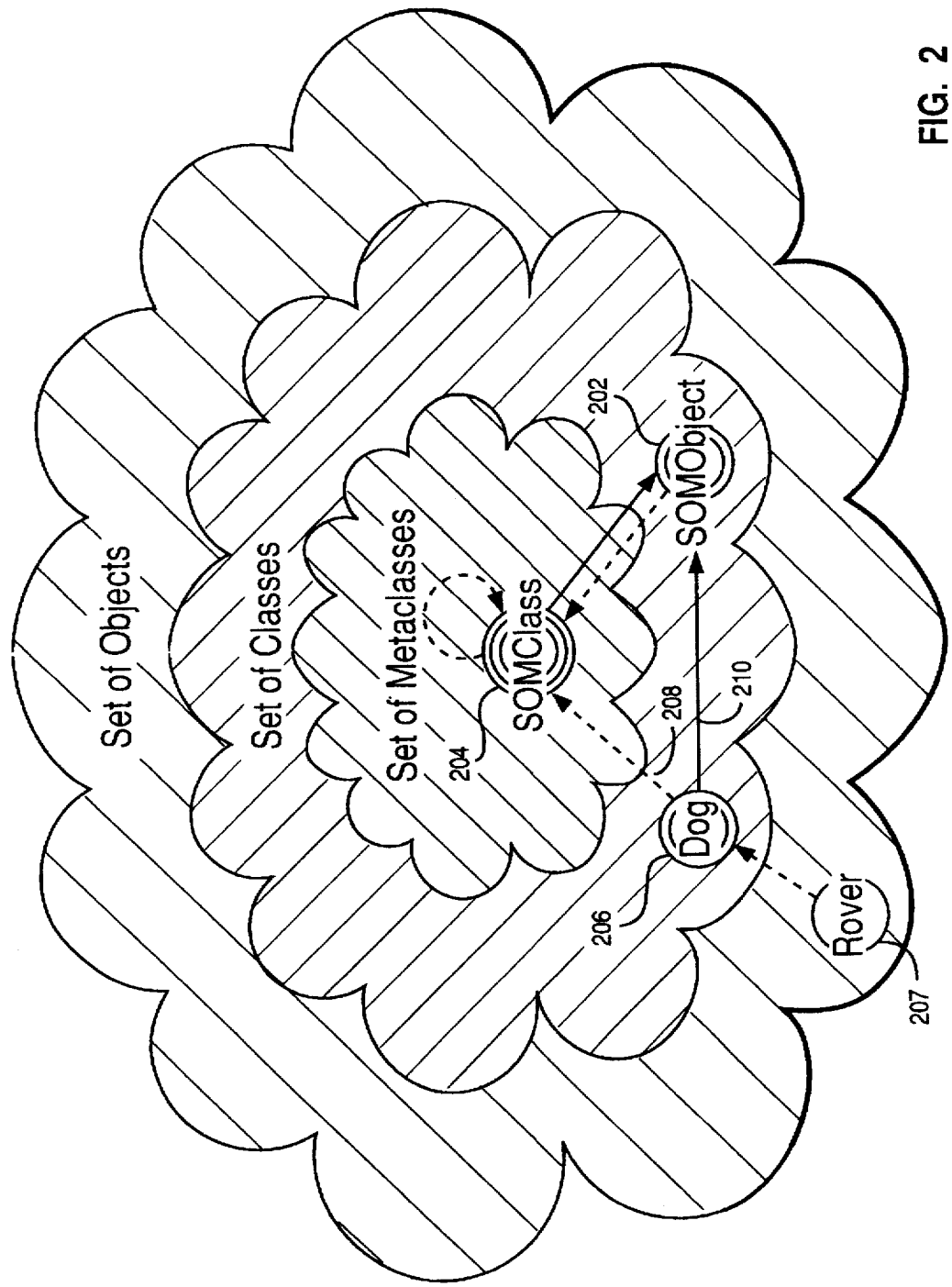
FIG. 2 is a diagram illustrating a basic System Object Model framework and labelling the framework elements.

The terminology of the IBM System Object Model object framework is presented with reference to FIG. 2. The IBM System Object Model product SOMobjects is an object-oriented framework. The framework consists of classes and objects that belong to those classes. In SOMobjects, classes are themselves objects and have all the properties of an object. Classes have the additional property of containing information about the methods or behaviors to which each object in the class responds. An object is the to respond to a method if the object contains process code for that method name. A class is said to support a method when objects in that class respond to that method. Methods supported by a class are those explicitly defined for that class and those inherited from classes that are parent classes for that class. Objects respond only to those methods supported by their class. The class of a class is frequently termed a meta-class.

SOMobjects has as its root object SOMObject 202. The class of SOMObject is SOMClass 204. A system developer can use SOMobjects to add additional classes. For example, the class "Dog" 206 is a subclass of SOMObject 202. "Rover" 207 is an instance of "Dog". Two relationships between objects can be expressed. The "instance of" relation is shown in the figure by a dashed arrow, e.g. 208 from an object to its class. The inverse relation is "class of", i.e., Dog is an "instance of" SOMClass and SOMClass is the "class of" Dog. The second relationship is "subclass of" represented by solid lines, e.g. 210, and its inverse "parent of". Thus Dog is a "subclass of" SOMObject and SOMObject is "parent of" Dog. Subclasses inherit methods from parent classes and can define additional methods that refine the implementation.

SOMClass is identified in FIG. 2 as being in the set of metaclasses. This is because it is the "class of" a class. Additional metaclasses, classes and objects can be created using known object-oriented techniques.

Figure 3:
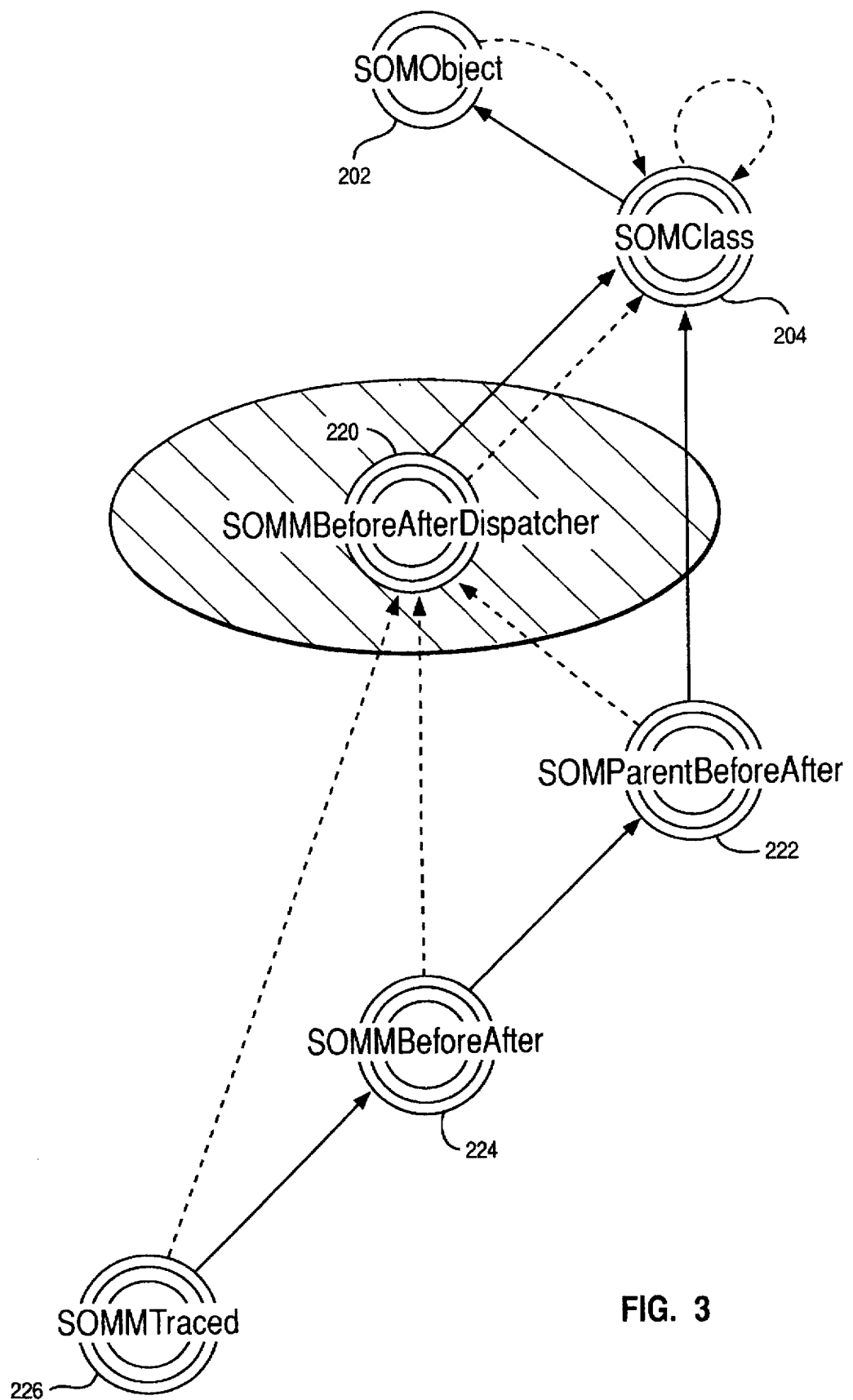
FIG. 3 is an object diagram illustrating the preferred embodiment of the present invention.

The preferred embodiment of the present invention is shown in FIG. 3. The framework of FIG. 2 has been extended by added four new metaclasses. SOMMBeforeAfterDispatcher 220 is a subclass of and an instance of SOMClass 204. SOMMParentBeforeAfter 222 is a subclass of SOMClass 204 and an instance of SOMMBeforeAfterDispatcher 220. SOMMBeforeAfter 224 is a subclass of SOMMParentBeforeAfter and an instance of SOMMBeforeAfterDispatcher 220. Finally, SOMMTraced 226 is a subclass of SOMMBeforeAfter 224 and an instance of SOMMBeforeAfterDispatcher 220.

SOMMBeforeAfterDispatcher 220 is the key component of the new framework. This is a class of several metaclasses (and thus a meta-metaclass) and provides BeforeAfter behaviors to its instance metaclasses, e.g., SOMBeforeAfter. Any subclass of SOMMBeforeAfter or the other metaclasses will also have the ability to cause execution of a method before each instance method execution and after each instance method execution by specifying a BeforeMethod or an AfterMethod or both. The abstraction of BeforeAfter processing into a meta-metaclass allows behavior implementation without specification in the Interface Definition Language (IDL) that is used to describe objects and their interrelationships.

Procedurally, implementation of before/after processing requires that the BeforeMethod be dispatched for execution, the instance method be dispatched for execution, then the AfterMethod be dispatched for execution. This procedure can be embodied in Dispatcher methods to handle dispatching of methods for execution. Because SOMMBeforeAfter and its subclasses must respond to this method, it must be supported by the class of SOMMBeforeAfter, i.e. metaclass SOMMBeforeAfterDispatcher 220. In particular, the SOMMBeforeAfterDispatcher implements BeforeMethodDispatch that searches for and dispatches any BeforeMethod in the class or parent classes, and AfterMethodDispatch that searches for and dispatches any AfterMethod in the class or parent classes.

The above structure provides a framework that allows a software developer to create a before/after class by creating a subclass of SOMMBeforeAfter and by defining a BeforeMethod and an AfterMethod.

SOMMTraced 226 is an example of a before/after class supplied with the SOMobjects framework. SOMMTraced provides the methods to support tracing of method execution in an object-oriented system. For example, it provides a BeforeMethod to print the calling parameters to a method call and an AfterMethod to print the return value from that method call.

SOMMParentBeforeAfter 222 is provided for those situations where before/after processing is desired only for inherited methods.

The structure of the preferred embodiment metametaclass SOMBeforeAfterDipatch is important because it provides associative composition of metaclasses for an object-oriented system. SOMobjects provides a syntax for specifying relationships between objects. This language allows the developer to provide, for example, an explicitly defined metaclass for each defined class. A complex system may be validly expressed in several different ways. Consistent operation of the system requires that each of those valid expressions provide the same result when processed.

SOMobjects enforces consistency by deriving metaclasses for each object. The process for deriving metaclasses is discussed in U.S. patent application Ser. No. 08/042,930 filed Apr. 5, 1993, which is hereby incorporated by reference.

SOMobjects allows multiple inheritance, i.e., a class can be a subclass or instance of two or more classes. Derived metaclasses ensures that each instance of that class validly responds to inherited methods. SOMobjects checks at runtime to determine whether the metaclass for each class supports the methods that could be executed by instances of that class. If not, SOMobjects derives the metaclass necessary to support all required methods.

Figure 4:
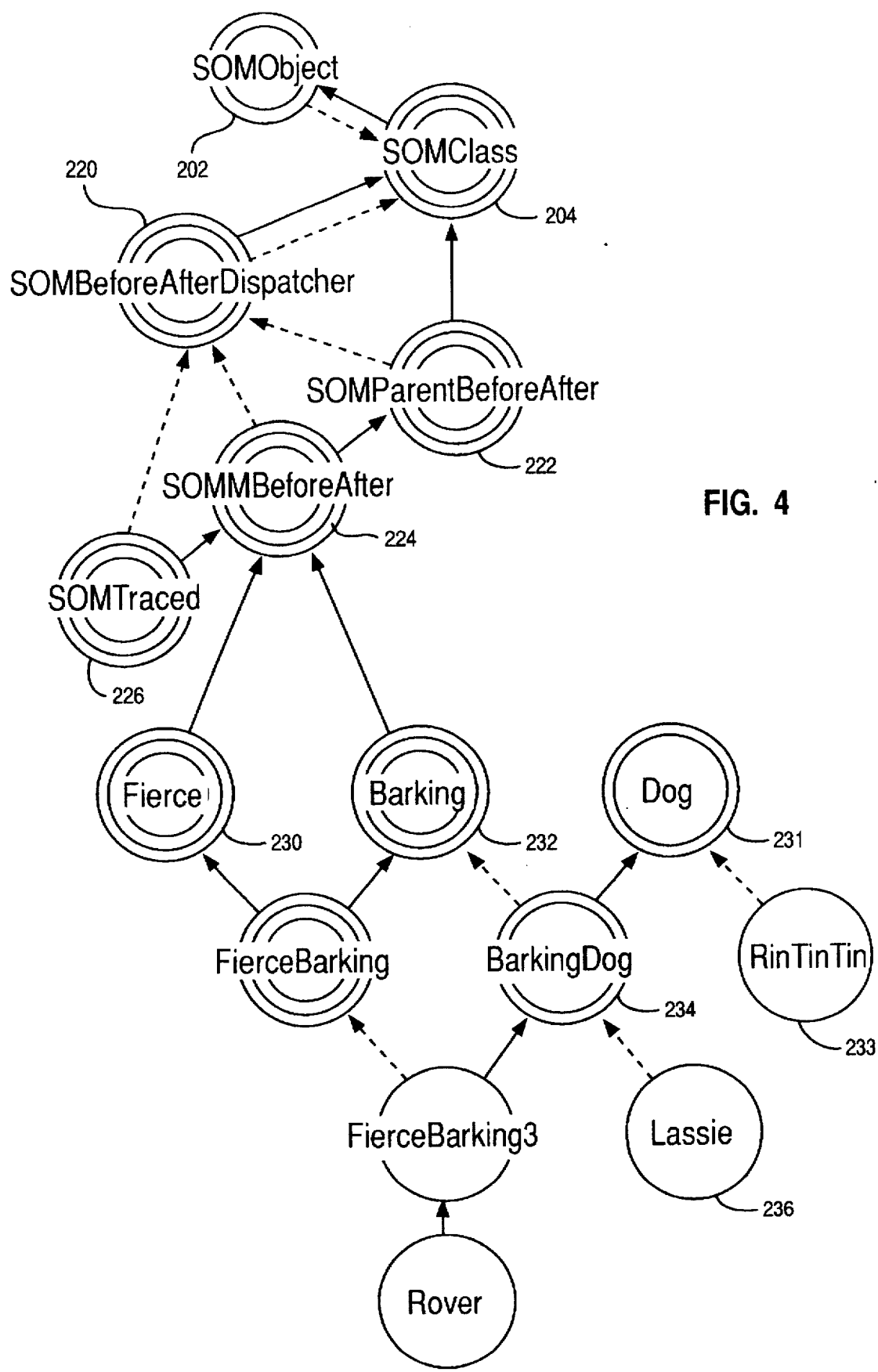
FIG. 4 is an object diagram illustrating an application of the framework of the preferred embodiment.

The SOMMBeforeAfter and SOMMBeforeAfterDispatcher structure supports metaclass derivation. An example of this is shown in FIG. 4. A "Dog" class 231 can be created as a subclass of SOMObject to define the properties of a class of Dogs. Dog may include a method "Fetch" that causes an animated image of a dog to cross the display screen 112. "RinTinTin" 233 can be created as an instance of "Dog" having certain properties. Sending the message "Fetch" to "RinTinTin" would cause an animated dog to cross the display screen.

The developer may want to add before/after features to the class of Dog. This can be done by creating "Barking" 232 a subclass of SOMMBeforeAfter. "Barking" can include a BeforeMethod that causes the word "WOOF" to be printed, and an AfterMethod that causes the word "woof" to be printed. The class "BarkingDog" 234 is created as a subclass of Dog 231 having an explicit metaclass of Barking 232. An instance of BarkingDog, e.g., Lassie, 236 would respond to the message "Fetch" by causing the printing of "WOOF", the animated crossing of the screen by a dog, and the printing of "woof".

A fierce dog could be created in a similar way by specifying subclassing SOMMBeforeAfter to create a "Fierce" class 230. The FierceDog would say "GRRR" before acting and "grrr" afterwards. Creation of a FierceDog could be accomplished as described above.

The composition problem is noticed when the developer attempts to create a "FierceBarkingDog". This new class can be defined in at least three ways. First, the class could be defined as a subclass of Dog with an explicit metaclass of "FierceBarking". "FierceBarking" would be created by multiple inheritance from Fierce and Barking. Second, the class could be defined as a subclass of FierceDog and BarkingDog. Finally, the class could be defined as a subclass of BarkingDog with an explicit metaclass of Fierce. Each of these represent valid SOMObject expressions. It is essential that each produce the same result.

SOMObject metaclass processing will analyze the methods required to be supported and derive any necessary metaclass. The result will be a use of metaclass FierceBarking as the actual metaclass for each of the three defined FierceBarkingDogs defined above. The explicit metaclass definition would be overridden to ensure consistency. A "Rover" instance of FierceBarkingDog would respond "GRRRWOOF" (animated dog) "woofgrrr" regardless of which of the three classes it instantiates. The result is associative composition because the form of definition is immaterial. Note, however, that the composition is not commutative, i.e., a FierceBarkingDog is not the same as a BarkingFierceDog.

The code for implementing the preferred embodiment of somDispatch in a before/after environment is illustrated below. This code is illustrative only and it will be clear to others in the field that many alternative embodiments exists without departing from the spirit of the invention.

The basic dispatch routine can be implemented as follows. "Self" refers to the instance receiving the message. "clientmethod" is the identifier of the method being invoked by the application and acquiring before/after behavior.

```
somDispatch(self, clientMethod)
    BeforeMethodDispatch(class(class(self)), self, . . .);
    retval := clientMethod(self, . . .);
    AfterMethodDispatch(class(class(self)), self, . . .);
    return retval;
```

The BeforeMethodDispatch is implemented as follows:

```
BeforeMethodDispatch(aMetaclass, clientObject, . . .)
    if aMetaclass defines BeforeMethod
        BeforeMethod(clientObject)
    else
        for all parents of aMetaclass that support
BeforeMethod
            BeforeMethodDispatch(aParent, clientObject, . . .)
```

This method will cause a BeforeMethod to be executed if defined for the client object or will cause a hierarchy traversal towards SOMClass looking for the first metaclass that defines BeforeMethod. AfterMethodDispatch is implemented as follows:

```
AfterMethodDispatch(aMetaclass, clientObject, . . .)
    if aMetaclass defines AfterMethod
        AfterMethod (clientObject, . . .)
    else
        for all parents of aMetaclass that support
AfterMethod(in reverse order)
            AfterMethodDispatch(aParent, clientObject, . . .)
```

AfterMethodDispatch traverses the hierarchy in reverse order where an AfterMethod is not defined for the client object.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A system for enabling construction of object-oriented classes implementing before and after behavior for each dispatch of a defined method process, said system operating in a computer system having at least one root class means having data and methods for processing said data, and wherein said root class means define an object-oriented framework, the system comprising:

means for dispatching, from a dispatcher metaclass, a BeforeMethod and an AfterMethod respectively before and after dispatching the defined method process, said means for dispatching being responsive to signaling of a BeforeAfter class means;

BeforeAfter class means for signaling the defined method process dispatch to said means for dispatching, said BeforeAfter class means being responsive to before and after behavior requests, said BeforeAfter class means being a subclass of said at least one root class means and an instance of said dispatcher class; and subclass means for generating before and after behavior requests to said BeforeAfter class means, said subclass means being a subclass of said BeforeAfter Class means and being responsive to an instance invocation of said defined method process.

2. A method for (generating associative object metaclasses in a computer system having memory and at least one central processing unit and, the method comprising the steps of:

specifying a plurality of defined classes having data and methods for operating on said data;

creating a user modifiable metaclass for dispatching before or after method processes;

testing said plurality of defined classes and said user modifiable metaclass to determine a set of methods required for executing instances of said defined classes and user modifiable metaclass; and creating a metaclass for executing said set of methods based on said testing.

3. A method, implemented in a computer system, for enabling construction of object-oriented classes implementing before and after behavior for each dispatch of a defined method process, comprising:

creating a metaclass dispatcher class for dispatching a BeforeMethod and an AfterMethod respectively while executing a user defined method process;

creating a root object defining an object-oriented framework having at least one class, said at least one class existing as a subclass of and an instance of said dispatcher class; and creating a BeforeAfter class as an instance of said dispatcher class and having at least one ParentBeforeAfter class, said BeforeAfter class causing the execution of BeforeMethod and AfterMethod in response to said user defined method process.

4. The method of claim 3 wherein said step of creating a BeforeAfter class includes the step of:

creating a subclass for generating before and after behavior requests to said BeforeAfter class, said subclass being a subclass of said BeforeAfter class and being responsive to an invocation of an instance of said defined method process.

5. The method of claim 3 wherein said BeforeMethod is a trace operation in said computer and said AfterMethod is a print operation.

6. A computer program product having a computer useable medium having computer readable program code means embodied in said medium for enabling construction of object-oriented classes implementing before and after behavior for each dispatch of a defined method process, comprising:

computer readable program code means for creating a metaclass dispatcher class for dispatching a BeforeMethod and an AfterMethod respectively while executing a user defined method process;

computer readable program code means for creating a root object defining an object-oriented framework having at least one class, said at least one class existing as a subclass of and an instance of said dispatcher class; and computer readable program code means for creating a BeforeAfter class as an instance of said dispatcher class and having at least one ParentBeforeAfter class, said BeforeAfter class causing the execution of BeforeMethod and AfterMethod in response to said user defined method process.

7. The computer program product of claim 6 wherein said computer readable program code means for creating a BeforeAfter class includes computer readable program code means for creating a subclass for generating before and after behavior requests to said BeforeAfter class, said subclass being a subclass of said BeforeAfter class and being responsive to an invocation of an instance of said defined method process.

* * * * *